July 30, 1940.
A. L. FOX
2,209,518
METHOD OF SUPPORTING AERIAL CABLE
Filed Oct. 29, 1937
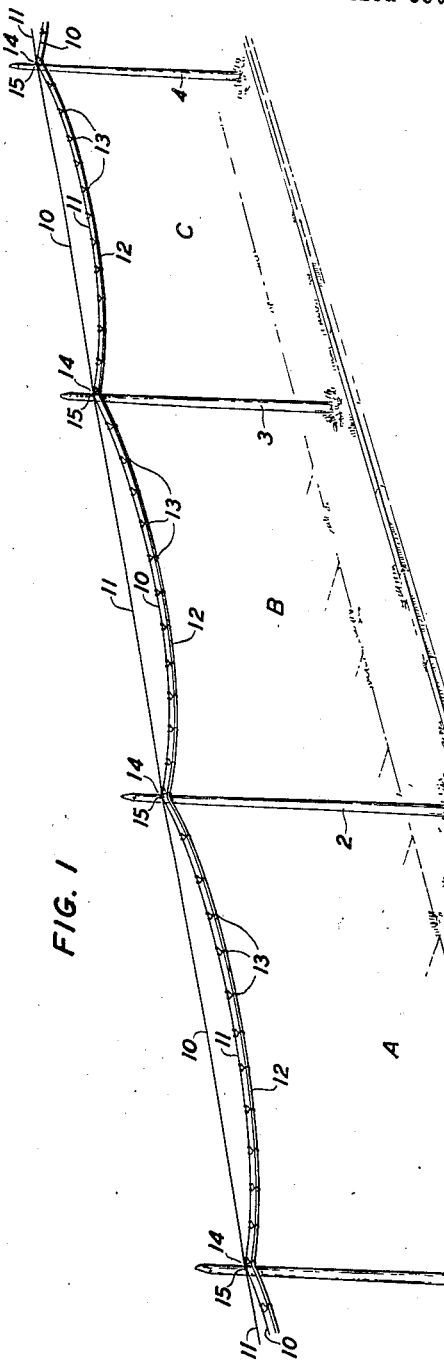
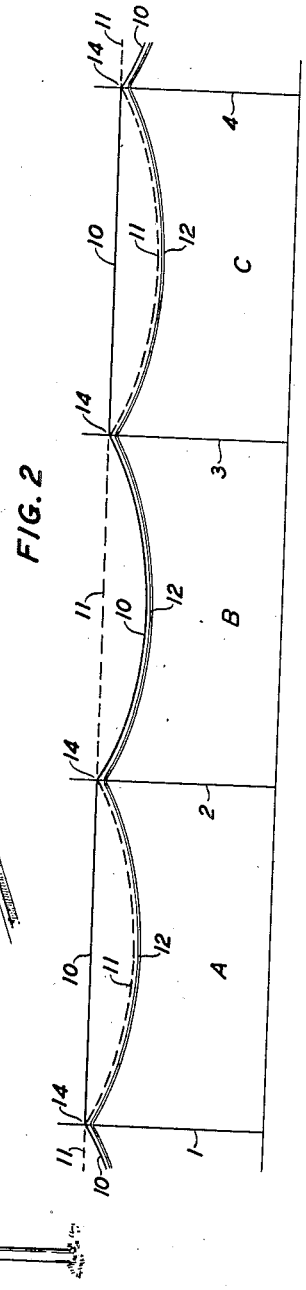
INVENTOR
A. L. FOX
BY J. MacDonald
ATTORNEY Patented July 30, 1940

2,209,518

UNITED STATES PATENT OFFICE 2,209,518

METHOD OF SUPPORTING AERIAL CABLE

Arthur L. Fox, Upper Montclair, N. J., assignor to Bell Telephone Laboratories, Incorporated, New York, N. Y., a corporation of New York Application October 29, 1937, Serial No. 171,610

2 Claims. (Cl. 174—41)

This invention relates to a method of supporting aerial cable and more particularly to a supporting arrangement adapted to reduce deteriorating effects which are created by the excess expansion and contraction of the cable over that of its suspension strand when subjected to temperature changes, which causes bowing and ultimate cracking of the cable sheath.

The present method of supporting aerial cable consists in first securing a messenger strand to each pole of the line, attaching cable supporting rings to this strand at substantially equal distances in order to form a support for the cable, and then drawing the cable through the rings where, initially, it lays substantially free from stress in a position uniformly distant from the supporting strand.

At installation, the length of the strand and the length of the cable are approximately the same, but as the temperature changes, this relationship changes, due to the fact that the coefficient of expansion of the cable is about 64 per cent greater than that for the strand; also since the strand has an initial stretch not experienced by the cable, the temperature elongation for the strand is less than if it were unstressed.

The effect of an increase in temperature above that at which the cable was spliced is such as to make the cable elongate to a greater extent than the strand, thus causing bows to develop in the cable. In the larger sizes of cable, these bows appear near the pole and as a result of swaying in the span, the cable is rubbed against the supporting rings, causing abrasion of the sheath. The alternate bowing and straightening of the cable due to temperature changes causes stresses in the sheath which are concentrated at abraided points and eventually result in fatigue of the sheath and cracks. These cracks permit the entrance of moisture and result in service interruptions. If bowing can be prevented or materially reduced, a considerable reduction in the maintenance expense for aerial cable will result.

It is evident that there would be no bowing if the coefficient of expansion of the strand were such that it would, under tension, elongate with temperature increases to the same extent as the unstressed cable. While an approach to a solution of the problem from this standpoint is impracticable, applicant has devised a method of supporting aerial cable, which approximates the desired condition, and eliminates to a large extent the tendency for the cable to bow.

Aerial cables are also subject to the so-called "dancing" of cables or violent oscillations that are produced at times by winds which set up harmonic vibrations in phase with the natural period of the cable spans. This dancing may, after a period of time, produce serious injuries to the cable sheath and sometimes to the supporting strand. Applicant's arrangement is such that when oscillations start, they will be dampened out before the amplitude reaches serious proportions.

It is the primary object of this invention to prevent or reduce the detrimental effect upon aerial cable caused by the repeated bending and straightening of the cable through various temperature changes and also dancing.

The present invention contemplates a method of suspension for aerial cable which provides that the temperature elongation of two spans of supporting strand is introduced into each span which supports cable, and moreover in which the supporting strands cross each other at the poles but do not cross the cable. This results in a net change in the length of each supporting span of strand approximately double that experienced with the single strand method suspension and more nearly equivalent to the change in length of the cable with its greater coefficient of expansion.

The invention will be more clearly understood from the following description when read in connection with the attached drawing in which:

Fig. 1 illustrates a portion of a pole line comprising three spans of cable which are suspended in accordance with applicant's invention;

Fig. 2 is a diagrammatic showing of the poles and the supporting strands of the pole line shown in Fig. 1.

In Fig. 1, there is shown a portion of a pole line which comprises three spans of an aerial cable supported by four poles. The spans of cable are indicated by the characters A, B and C and the poles by the numerals 1, 2, 3 and 4. Each of the spans A, B and C comprises a pair of messenger or supporting strands 10 and 11 which in turn support the cable 12 by means of the cable rings 13.

By referring to Figs. 1 and 2, it will be observed that the two messenger strands 10 and 11 are arranged so that the successive spans of cable are supported alternately first on one strand and then on the other. Each strand, therefore, has an unloaded span associated and continuous with each span which supports cable. The attachment of the strands 10 and 11 to the poles 1, 2, 3 and 4 at points 14 is such as to leave these associated spans free to adjust themselves when changes in temperature occur.

In Fig. 1 the desired method of suspension may be accomplished by having the strands 10 and 11 both rigidly attached at the poles 1 and 3 and freely supported on poles 2 and 4 at the points 14 by means of the supports 15 or in any other manner which permits an unloaded span of strand to be in each case freely associated with a loaded span.

From the foregoing it is readily apparent that for any change in length of a span of cable due to temperature variation, there will be associated with it a change in the length of two spans of strand. This results in maintaining a smaller differential in the length of a span of cable and its supporting strand, with temperature changes, than occurs with the single strand method of suspension.

Although this invention is shown in a specific form, it is to be understood that it is not limited to the details shown and that modifications may be made without departing from the spirit of the invention, and that it is only limited by the scope of the appended claims.

What is claimed is:

1. In a transmission line, a line of spaced poles, a sheathed cable, a pair of supporting strands therefor having a substantially smaller coefficient of thermal expansion than the cable coefficient, each supporting strand being fixedly supported at alternate poles only and slidable relative to the other poles, cable securing means on alternate spans only of each strand for hanging the cable thereon, whereby each supporting strand supports said cable only in alternate spans and the stretch and expansion of a strand in a span in which it does not support cable is distributed in the same strand in an adjacent span which supports cable.

2. In a transmission line, a line of spaced poles, a sheathed cable, a pair of supporting strands therefor having a substantially smaller coefficient of thermal expansion than the cable coefficient, said strands being fixedly supported at alternate poles only and slidable relative to the other poles, and both strands crossing each other at each pole, and cable securing means positioned on alternate spans only of each strand for hanging the cable thereon, whereby each supporting strand supports said cable only in alternate spans and the stretch and expansion of a strand in a span in which it does not support cable is distributed in the same strand in an adjacent span which supports cable.

ARTHUR L. FOX.